United States Patent [19]

Garrett et al.

[11] Patent Number: 5,484,832

[45] Date of Patent: Jan. 16, 1996

[54] MODIFIED POLYURETHANE INCLUDING SILICA AND METHOD OF MANUFACTURE THEREOF

[75] Inventors: Thomas M. Garrett, Pittsburg, Kans.; Indulis Gruzins, Corona, Calif.

[73] Assignee: MCP Industries, Inc., Corona, Calif.

[21] Appl. No.: 167,544

[22] Filed: Dec. 14, 1993

[51] Int. Cl.[6] ................ C08J 5/24; C08K 5/54; C08K 3/36
[52] U.S. Cl. .......... 524/261; 524/267; 524/590; 524/872; 524/873; 523/212; 523/213
[58] Field of Search .................... 524/590, 261, 524/267, 872, 873; 523/212, 213

[56] References Cited

U.S. PATENT DOCUMENTS

| | | | |
|---|---|---|---|
| 3,220,731 | 11/1965 | Germino et al. | 106/210 |
| 4,093,673 | 6/1978 | Chang et al. | 525/102 |
| 4,179,537 | 12/1979 | Rykowski | 106/287.16 |
| 4,565,644 | 1/1986 | Smith et al. | 521/110 |
| 4,640,950 | 2/1987 | Nishino et al. | 524/872 |
| 4,687,533 | 8/1987 | Rizk et al. | 524/588 |
| 4,722,951 | 2/1988 | Yoshioka et al. | 106/163.1 |
| 4,906,676 | 3/1990 | Ida | 523/212 |
| 5,017,322 | 5/1991 | Brooks | 264/255 |
| 5,091,444 | 2/1992 | Bauer et al. | 524/872 |
| 5,109,057 | 4/1992 | Tsuno et al. | 524/590 |
| 5,115,007 | 5/1992 | Chihara et al. | 524/267 |

*Primary Examiner*—Paul R. Michl
*Assistant Examiner*—Olga Asinovsky
*Attorney, Agent, or Firm*—Litman, McMahon and Brown

[57] ABSTRACT

A modified polyurethane structionally incorporating silica into a polyurethane polymer. The silica is first fluidized with a polyol and then reacted with a linking component having an organo reactive group that is reactive with an isocyanate. Polyisocyanate and additional polyol are added to the reaction mixture such that the isocyanate reacts with the linking component and the polyol to form a polymer wherein the silica is an integral unit in the polymer. The resultant modified polyurethane has good dynamic properties and is surprisingly resilient.

33 Claims, No Drawings

MODIFIED POLYURETHANE INCLUDING SILICA AND METHOD OF MANUFACTURE THEREOF

BACKGROUND OF THE INVENTION

The present invention relates to a modified polyurethane, especially useful as a coating for athletic surfaces, that structionally incorporates a substantial quantity of silica into the polymer thereof and a method of manufacture of the composition.

Polyurethanes are utilized for coating many different types of surfaces, as foams, as elastomers and for numerous other purposes. While polyurethanes are useful for a wide variety of applications, they have been especially useful in coating athletic surfaces such as the floors of gymnasiums or basketball courts. For such purposes it is desirable for the polyurethane to have a low durometer yet a relatively high resilience, as the low durometer tends to cushion an impact made by an athlete on the surface and the high resilience tends to enhance the athletic performance of the athlete. In general it can be stated that athletic surfaces of this type preferably should have high elastomeric or dynamic properties.

Also in general terms, many different types of fillers can be and have been added to polyurethane precurser mixtures. The reason for adding fillers to conventional plastic materials has varied. For example, fillers may be added to increase bulk, to increase hardness, to increase thermal insulation or chemical resistance of a plastic such as polyurethane.

One of the fillers that has been conventionally used for this purpose has been silica (also referred to as sand or silicon dioxide). In particular, silica has been added to plastics to increase the hardness and thermal insulation characteristics of the plastics. While the silica is effective in improving certain qualities of plastics, it has always conventionally deteriorated other characteristics. In particular, when silica is added to polyurethane in a conventional manner, the polyurethane becomes more brittle and less elastomeric. For example, in the book *Polyurethane: Chemistry and Technology;* by Sanders et al, published by Wiley, NY in 1964 in Volume 1 page 343, a table indicates that elasticity of polyurethanes decreases as filler level is increased.

Since dynamic characteristics such as resilience are desirable for many of the uses of the polyurethane and, in particular, for uses of polyurethane on athletic surfaces, fillers such as silica have normally not been available for use in polyurethanes to be utilized for uses requiring good dynamic properties. Consequently, the amount of silica that has been added to conventional polyurethane coatings has been non existent or relatively small, when the coating requires good dynamic or elastomeric properties.

Because silica in the form of sand is a highly abundant, easily obtained and inexpensive building material, it is desirable to be able to incorporate silica into a polyurethane type of coating wherein the coating would maintain a relatively low durometer and not become brittle. Likewise, the coating should be relatively elastic or resilient and have generally overall good dynamic properties.

Because silica is so much less expensive in comparison to the other precurser components of a polyurethane, it is desirable that as much silica as possible also be utilized within the modified polyurethane. In order to accomplish this, a modified polyurethane is provided hereunder that structurally incorporates the silica into the modified polyurethane polymer rather than simply surrounding the silica or tethering the silica to the polyurethane polymer as in the prior art compositions.

SUMMARY OF THE INVENTION

The present invention is directed to a modified polyurethane coating. As used herein, the term modified means that the conventional polyurethane polymer incorporates additional precursers into the polymer molecule other than the conventional polyol and isocyanate components of typical polyurethane. In particular, the modified polyurethane polymer of the present invention incorporates a relatively high percentage of silica (also referred to herein as silicon dioxide or sand) as a portion of the components forming a chain in the structure of the polymer in conjunction with a silane forming a polyamine such that the overall modified polyurethane contains polyurea as a result of the incorporation of the polyamine. In this manner the silica is a high percentage by weight of the modified polyurethane, preferably about 50% by weight, without significantly reducing the dynamic properties of the polyurethane polymer, as compared to polyurethane wherein the silica has not been included. It is especially desirable to maintain a low durometer and a relatively high resilience in the resulting cured modified polyurethane.

The silica is incorporated into the polyurethane polymer by utilization of an organo-silica linking component. Preferably, the linking component is a silicon based material of the type including silanes and siloxanes. The linking component includes two different functional groups. The first functional group is an organo functional group that is effective in reacting with and binding to organic compounds. Also, preferably, the first functional group is an amino group that is reactive with isocyanates. However, other types of reactive groups which are suitable for reacting with an isocyanate are also functional within the present invention and include thiol, hydroxyl and carboxyl groups.

The second functional group of the linking component must be capable of reacting with exposed hydroxyl groups on the surface of the silica in order to form a bond between the linking component and the silica. That is, even though silica is conventionally thought of as silicon dioxide, there are a substantial number of hydroxyl groups on the surface of the silica which are available for linking with the second functional group of the linking component. Preferably, the second functional group is an alkoxy radical having from 1 to 8 carbon atoms, such as methoxy or ethoxy radicals, which upon reaction with the hydroxyl group release methanol or ethanol respectively, while binding the remainder of the linking component to the silica. Thus, preferably, the linking component is an organo silane or siloxane having at least one alkoxy group and at least one amino group.

In accordance with the present invention, a method is provided of first binding or joining the linking component to the silica. In particular, the silica and the linking component are preferably first mixed together and allowed to react prior to addition of any isocyanate to the reaction mixture. The silica is first ground to a powder that is preferably within a range of approximately 0.5 to 10 microns in diameter.

A polyol which will eventually be a reactive component with isocyanate in forming the modified polyurethane is added to the silica to wet and fluidize or suspend the silica. The purpose of the polyol at this stage in the method is not to react, but rather to simply fluidize the silica.

The linking component, especially in the form of amino alkoxysilane is then added to the reaction mixture and allowed to react with the hydroxyl radicals positioned on the surface of the silica. Preferably, the reaction conditions during this period of the method are maintained in such a manner that as little as possible of the polyol reacts with the silane. In particular, as much of the reaction is completed as possible before the addition of a urethane catalyst which increases the likelihood of a reaction between the silane and the polyol. Because of the size of the silica particles in comparison to the molecules of silane, it is foreseen that many and most likely numerous silane molecules will react with and bind to a single silica particle.

Subsequent to the reaction of the silanes with the silica, an isocyanate is added to the reaction mixture. Preferably, the polyol has multi-functional hydroxyl groups and the isocyanate is a polyisocyanate having multiple functional isocyanate groups such that the isocyanate can react with multiple polyols and/or silanes so as to produce a modified polyurethane polymer in accordance with the present invention.

Additional components such as catalyst, dyes, surfactants and the like may be added to the composition as required for expediting curing, providing color or the like. It is noted that the original polyol utilized to fluidize the silica is also used as a reaction component with the isocyanate, although additional polyol may be added to the reaction mixture at or before the addition of the isocyanate.

Objects and Advantages of the Invention

Therefore, the objects of the present invention are to provide: a modified polyurethane having a relatively high percentage of silica incorporated therein with relatively good dynamic properties including a low duometer and relatively high resiliency; to provide a method of producing such a polyurethane wherein an organosilane is utilized to polymerically link the silica into the polymeric chain of such a modified polyurethane; to provide such a method wherein a reaction mixture is formed wherein the silane is initially linked to the silica and thereafter the polyurethane is formed with additional polyurethane precursors or prepolymers added to the reaction mixture; to provide such a method wherein a polyol is utilized to fluidize the silica during the mixing and reacting of the silica with the silane; and to provide such a method and composition which are relatively inexpensive and provide a high quality polyurethane which is specially adapted for the intended usage thereof.

Other objects and advantages of this invention will become apparent from the following description wherein are set forth, by way of illustration and example, certain embodiments of this invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In accordance with the present invention, a modified polyurethane is provided for use as a coating, foam, elastomer or for other similar purposes. One especially effective use of the modified polyurethane is as a coating of a floor used for athletic purposes, such as a gymnasium or basketball court floor.

In the present invention, silica or sand is polymerically incorporated into the polyurethane. The silica is a relatively inexpensive component and adds substantially to the volume of the composition without significantly adding to the cost. Consequently the overall cost of a polyurethane coating in accordance with the present invention is substantially less than conventional polyurethanes not using silica.

Silica has been used as a filler in polyurethane coatings in the past and for imparting certain characteristics to polyurethane. The method and resulting product from the addition of silica to the prior art polyurethanes and the incorporation of silica into the present invention are quite different, as is especially shown by the characteristics of the final products. In particular, the tests results suggest that the silica of the present invention is incorporated into the polymeric matrix of the polyurethane as a constituent in the chain or matrix of the polymer. It is further believed that in the prior art the silica is simply encased by and within the polymeric matrix or alternatively tethered to the matrix by use of silanes or the like.

Specifically in the present invention it is foreseen that the silica, preferably finely ground to between one half and ten microns in diameter provides fairly large (on a molecular scale) structural blocks or spheres having a number of hydroxyl groups exposed on the surface thereof. While silica is conventionally considered to be silicon dioxide, it does include a number of surface hydroxyl groups of this type. The hydroxyl groups are effectively used as a binding location for the polyurethane matrix to be formed.

A linking component comprising a silicon based material having an organo silane or siloxane is utilized to link with the silica hydroxyl radicals. In particular, the linking component has one silica reactive group which is effective in linking with the hydroxyl radicals on the silica. A highly effective silica reactive group is an alkoxy group, especially methoxy or ethoxy. While specific alkoxy groups are identified herein, it is foreseen that other types of reactive groups could be utilized for this purpose, especially alkoxy groups having fewer than four carbons.

The silane or connective component also includes a second reactive organo group that is suitable for reacting with an isocyanate to form a reaction product therewith. A preferred organo reactive group is an amino group; however, it is foreseen that numerous other types of groups that would be effectively reactive with an isocyanate could be utilized for this purpose.

A particular class of chemicals that are highly effective for use as a connective component are aminotrialkoxysilanes. A specific trialkoxysilane that has been found to be effective is 1-diethylenetriamino-3-trimethoxysilylpropane, a triaminofunctional silane. Additional silanes that would be useful for this purpose are aminopropyltriethoxysilane and aminopropyltrimethoxysilane. Preferably, the alkoxy groups of the silanes have from 1 to 3 carbons and the organo reactive group is bound to an alkyl having between 1 and 20 carbons, especially between 3 and 8 carbons.

The silica prior to and during mixing with the silane is preferably fluidized by use of a polyol of the type that is conventionally utilized in the formation of polyurethanes. In particular, polyurethanes normally require a hydrogen providing or hydroxyl terminated compound which, when terminated by a pair of hydroxols, is referred to as a diol or, when terminated by three hydroxols, is referred to as a triol and, in general, both are referred to as polyols.

Many of the polyols utilized in polyurethanes are of the polyester or polyether family. For example, a suitable polyester polyol may have a polyethylene oxide formula such as $HOCH_2CH_2OCH_2CH_2OOCCH_2CH_2 \ldots CH_2CH_2OH$. Typically the hydroxyl equivalent of the polyol may be in the range of 1000 to 2000 for soft and flexible polyurethanes and may decrease into the range of 100 to 200 for denser and more rigid polyurethanes constructed of polyols usually utilizing more than two hydroxyl or functional groups per molecule.

The polyols of the present invention preferably have a hydroxyl equivalent weight in the range of 1000 to 2000, but hydroxyl equivalent weights on either side of this range are foreseen to be functional in various aspects of this invention, especially where the invention is utilized for the production of foams that are relatively more rigid. Many suitable polyols for this purpose find their basis in polypropylene oxide, polyethylene oxide, and polytetramethylene oxide. Suitable polyols for certain formulations of the present invention includes products sold commercially under the product names G30-28, G20-57, G20-28, G30-112, G30-57, G26-150, G30-280, L220-28, LX-332 -52, X220-56 by Olin; Poly Meg 2000, 1000, 650 by Q O Chemicals; Thanol F3550 by Eastman and Mutranol 3600 by Miles.

In the present embodiment, it is desirable that the polyol not react at all with the silane or react as little as possible with the silane during the fluidization of the silica during which period the silica is reacted with the second reactive group of the silane which reacts with silanols or hydroxyl groups on the silica as opposed to the first organic reactive group of the silane which is reactive with isocyanate. That is, the reaction of the silane with the polyol is considered to be an undesirable side reaction and it is limited by reaction conditions as much as possible. In particular, catalyst that would normally enhance the reaction kinetics between the silane and polyol is normally added near the end of the process when the silanes have already substantially reacted.

In accordance with the method of the present invention, in theory, the silica reacts with the silane, and then the silane is bound to surface locations about the silica particle which is much larger than the silane molecules. Subsequently, remaining conventional polyurethane precursers are added to the mixture. In general terms urethanes are prepared by reacting hydroxyl-terminated compounds with an isocyanate. Polyurethanes typically are formed from polyols and polyisocyanates. In particular, additional polyol of the type described is added to the mixture in such a manner as to provide an overall polyol equivalent weight that is desirable for the particular product to be formed. Preferably, the polyol is at least a diol and may be a triol or higher polyol having more functional hydroxyl groups, especially where cross linking may be desirable.

As one of the polyurethane reaction components or precursers, an isocyanate is added to and mixed with the reaction mixture. The isocyanate is normally the last ingredient added to the composition mixture that becomes part of the polymer, especially because once it is added to the mixture of the other reaction components, polyurethane starts to cure or form a plastic polymer polyurethane matrix. In the present invention, the isocyanate binds with both the polyol and the first reactive group on the silane. In particular, the isocyanate is preferably a diisocyanate wherein one end of a portion of the isocyanate reacts with the first reactive group of the silane and an opposite end of such isocyanate reacts with at least one end of a polyol. A second portion of the isocyanate, which varies in percentage as to the end product to be made, reacts with only polyols.

In this manner, it is believed that the matrix of the modified polyurethane formed includes a chain of units wherein the silica is linked to a silane which in turn is linked to an isocyanate which then links with a polyol. Isocyanate and polyol linked units of the matrix may be repeated many times or just once and, thereafter, the isocyanate at the end of the chain again reacts with a silane which is preferably attached to another silica particle to form a matrix. Since the silica particles are quite large compared to the other molecules in the chain, there may be multiple chains linking different silica particles together and in general a wide and complex matrix is formed of the modified polyurethane.

A number of different isocyanates are available for use as the isocyanate of this component of this invention. A preferred isocyanate is methylenediphenylenediisocyanate (also known as MDI) which is available from Miles under the product name E-448 or from ICI as Rubinate 1680. Other conventionally used isocyanates are isomers of tolune diisocyanate (TDI), poly MDI, poly TDI, prepolymers of all isocyanates, PPDI, HMDI and mixtures thereof. Such isocyanates are commercially available under the product names MONDUR ML, MR8-2 and MR-5 from Miles; PBA-23291, XCP- 1001A, RUBINATE 1680, RUBINATE 9310, RUBINATE 9275, RUBINATE 1209, RUBINATE 9210, RUBINATE 9372 from ICI; ELASTOPOR P1038 U ISO, LUPRANATE MD102, LUPRANATE M10, LUPRANATE M20S from BASF and CHEMAPOL 35-0002 from Cook Composites and Polymer Company.

The modified polyurethane of the present invention can be utilized in a variety of products including coatings, foams, elastomers and the like. In accordance with the present invention each of these products can be made with a substantial amount of silica while having dynamic properties that are quite similar to a polyurethane wherein the silica was not incorporated. In accordance with the present invention a preferred quantity of silica within the final product is approximately 50% by weight, although the range of included silica can vary greatly especially below the 50% level to about 1%, but larger percentages are preferable.

The modified polyurethane of the present invention may also have other additives such as pigments and dyes to provide a specific color to the final product and surfactants to better define the cell structure, fused in a resultant polyurethane foam.

It is also noted that under the present invention that it is typically preferably to react the reaction components of the polyurethane precursor under a vacuum so that volatile condensation products produced during the reaction, such as methanol or ethanol, are withdrawn from the reaction mixture in order to help drive the reaction to completion. Typically the process conditions will be that the reaction mixture will be at 220° Fahrenheit from one to four hours at a vacuum of minus 26 inches of mercury.

Preferably, isocyanates are utilized in the present invention in a slight excess as compared to the polyols in terms of available functional groups. The excess is for two reasons, the first being that some amount of the isocyanate must react with the amino groups on the silanized silica. The second reason is that an excess of isocyanate typically produces a reaction product chain that has an isocyanate on the end of a chain making it more likely to be available for linking with the silane or additional polyol. A preferred range of ratios of functional groups of isocyanate to functional groups of polyol is from about 1.1 to about 1.25.

As has been previously noted, the addition of polyols to the mixture may be bifurcated, such that part of the polyol is added at the time of addition of silane and part is added at a later time. It is possible to add the entire amount of the polyol to the reaction mixture with the silane; however, it is believed that adding a smaller amount initially allows for better diffusion of the silane on to the silica particle during silanization, as not all of the polyol is required to wet or fluidize the silica.

Silanes are added to the reaction mixture of the present invention in an amount that preferably provides sufficient silane to completely silanize the silica particles and provide a cross linking rather than tethering between the silica and each of the polymeric chains of polyurethane to be made in the reaction mixture. The reaction temperature is preferably elevated above ambient and a reaction temperature during reaction of the silane to the silica in the range of 220° Fahrenheit has been found to be effective. It is noted in the prior art that silane additions have usually been made at lower temperatures and lower stoichiometries.

The temperature of the reaction mixture is relatively important, especially to the silane-silica reaction. The silane-silica reaction is also somewhat dependent upon the shear and mixing applied to the components during the reaction period. However, a higher temperature reduces the mixing time. Consequently, to speed the reaction the reaction temperature is raised and, as noted above, a preferred temperature is approximately 220°.

It is also important to the overall modified polyurethane of the present invention to maximize the silanization of the silica. One further comment about reaction temperature of the overall reaction mixture, is that the prior art has shown that the dynamic properties of certain polyurethanes wherein sand is utilized as a simple filler have somewhat improved with temperature. However, in such compositions the dynamic properties tend to stop improving at approximately 130° Fahrenheit and never achieve the dynamic properties associated with the modified polyurethanes of the present invention.

Also regarding dynamic properties of the modified polyurethanes, it has been found that otherwise given the same constituent components that the dynamic properties are more heavily dependent upon the average equivalent weight of the polyol and isocyanate components than on the average weight between cross links or average molecular weight of these components. Also given other factors being the same, it is possible to generally make the polyurethanes of the present invention more flexible by raising the molecular weight of the polyol and isocyanate components, lowering the average number of functional groups among the polyols and isocyanates and/or lowering the cross linking between the polyols and isocyanates.

The order of addition of the components of the present invention is important in determining the dynamic and other properties of resulting modified polyurethane. Normally, the silane is allowed to mix with the silica prior to mixing of the isocyanate therewith. Also preferably the isocyanate is allowed to react for a short time with the silanes and polyols prior to addition of catalyst to the reaction mixture to reduce the likelihood of a substantial amount of reaction between the polyols and the silanes. This latter reaction has a tendency to produce a high viscosity reaction mixture which is typically undesirable.

The novel use of silanes in the present embodiment to actually incorporate silica into the modified polyurethane polymer as an active component of that polymer rather than as simply being a non functional part of the polymer that is surrounded by the polymer or connected to it, allows the production of a modified polyurethane that has surprising dynamic properties as compared to conventional polyurethanes incorporating sand or silica as fillers. This is especially true when silica in accordance with the present invention can be incorporated into the modified polyurethane in amounts of 50% or greater, yet the modified polyurethane has relatively very good dynamic properties. The main key of the present invention is that the silica is reacted with the silane to become an active reagent in the production of the modified polyurethane polymer and subsequently an integral part of the polymer.

The following examples are provided to illustrate and describe the invention and are not intended to be limiting upon the scope of the claims of the invention.

EXAMPLE 1

The following components were prepared:

| | Overall Weight Percentage |
|---|---|
| Group A | |
| 1) 121.5 pounds of silica marketed under the trade name Imsil A-25 having an average particle size of 3.5 microns. | 48.6% |
| 2) 34 pounds of polyether triol having a 2000 equivalent weight (a polypropylene oxide triol) sold under the product name of POLY-G(R) 30-28 by Olin Corporation of Stamford, Ct. | 13.6% |
| 3) 61 pounds of polyether diol having a 1000 equivalent weight (a polypropylene oxide diol) sold under the product name POLY-G(R) 20-57 by Olin Corporation | 24.4% |
| 4) 10 grams of umber pigment | 0.0088% |
| 5) 20 grams of yellow pigment | 0.0176% |
| 6) 80 grams of titanium dioxide pigment base | 0.0705% |
| Group B | |
| 1) 80 grams of aminomodified propyltrimethoxysilane ($H_2NC_2H_4NHC_2H_4NHC_{3\,4\,6}Si(OCH_3)_3$) sold under the product name Silane A-1130 by Union Carbide Chemicals of Danbury, Ct. | 0.0705% |
| Group C | |
| 1) 13,920 grams of polyether diol having a 2000 equivalent weight (a polypropylene oxide diol) sold under the product name POLY-L (R) 220-28 by Olin Corporation | 12.3% |
| 2) 960 grams of poly (oxytetramethylene) diol (and other polymers) having a 1000 equivalent weight (a polytetramethylene oxide diol) sold under the product name POLY MEG ®2000 by QO Chemicals of West Lafayette, Ind. | 0.85% |
| 3) 40 grams of surfactant sold under the product name Silwet L7604 | 0.0352% |
| Group D | |
| 1) 100 grams of bismuth catalyst sold under the pro- | 0.0881% |

-continued

| Group D |  |
|---|---|
| duct name Coscat 83 |  |

At 220° F. for the entire process, Group A was placed in a blender and mixed for 10 minutes. Group B was added to Group A and the mixture was mixed in the blender while drawing a vacuum of negative 26 inches of mercury for 2 hours. Subsequently, Group C was added to the blender and mixed with Group A and B for one half hour under a vacuum of negative 26 inches of mercury. Thereafter, Group D was added to the blender and mixed with the other Groups for 10 minutes. The resulting modified polyurethane product had very good dynamic properties.

EXAMPLE 2

A blend was made comprising by weight approximately 50% silica, 50% polypropylene oxide diol having an equivalent weight of approximately 1000, and 0.075% triamino-functional silane (A-1130). This blend was mixed thoroughly and under vacuum for approximately two hours, at 220° F. Thereafter Coscat 83 catalyst in an amount of 0.088% by weight of the original mixture was added to the reaction mixture and mixed thoroughly for one half hour under vacuum. The blend was cured with diioscyanate (MDI sold as E-448) in an amount of 7.8% by weight of the original mixture. The polyurethane elastomer produced had the following physical properties:

| Physical Properties and ASTM Test Used | Test Results |
|---|---|
| Rebound D-3574 | 50% |
| Hardness D-2240 | 62A Shore |
| Elongation D-412 | 400% |
| Tinsle D-412 | 920 PSI |
| Tear D-624 | 98 PLI |

EXAMPLE 3

A polyurethane elastomer was made in exactly the same manner as with Example 2 and with exactly the same compositions except no heating was used and no silane was added to the mixture. The polyurethane elastomer produced in this manner had the following characteristics when measured by the same ASTM Tests as are identified with the previous example:

| Characteristic Tested | Test Results |
|---|---|
| Rebound | 28% |
| Hardness | 30A Shore |
| Elongation | 580% |
| Tinsle | 170 PSI |
| Tear | 63 PLI |

EXAMPLE 4

An elastomer was manufactured in the same manner as described in Example 2 with the same compositions except there was no heating and no silica or silane was used. The resulting product was tested with the same tests as Example with the following results:

| Characteristic Tested | Test Results |
|---|---|
| Rebound | 52% |
| Hardness | 25A Shore |
| Elongation | 170% |
| Tinsle | 153 PSI |
| Tear | 24 PLI |

It is to be understood that while certain forms of the present invention have been illustrated and described herein, it is not to be limited to the specific forms or compositions described herein.

What is claimed and desired to be secured by Letters Patent is as follows:

1. A method of manufacturing a modified polyurethane composition incorporating silica and having relatively good dynamic properties comprising:
   (a) mixing and reacting particulate silica with a linking component having a silica reactive group and an organo reactive group to form a first reaction product;
   (b) thereafter mixing and reacting said first reaction product with an isocyanate and a polyol to form the modified polyurethane incorporating the silica into the polymer of the modified polyurethane.

2. The method of claim 1 including the step of:
   a) initially fluidizing said silica in said polyol, but maintaining reaction conditions while reacting said silica with said linking component such that substantially no side reaction occurs between said polyol and said linking component in comparison to said silica.

3. The method according to claim 1 wherein:
   (a) said linking component is a silane.

4. The method according to claim 3 wherein:
   (a) said silica reactive group is an alkoxy group having between 1 and 6 carbons.

5. The method according to claim 4 wherein:
   (a) said silica reactive group is selected from the set consisting essentially of methoxy, ethoxy and mixtures thereof.

6. The method according to claim 3 wherein:
   (a) said organo reactive group is selected from the set consisting essentially of amino, thiol, carboxyl, hydroxyl and mixtures thereof.

7. The method according to claim 3 wherein:
   (a) said organo reactive group is amino.

8. The method according to claim 3 wherein:
   (a) said silane is an aminotrialkoxysilane.

9. The method according to claim 8 wherein:
   (a) each alkoxy has between 1 and 2 carbons.

10. The method according to claim 1 including the step of:
    (a) adding a polyurethane catalyst subsequent to substantial formation of said first reaction product.

11. The method according to claim 1 including:
    (a) selecting said silica to have a diameter about in the range from between 0.5 and 10 microns.

12. The method according to claim 11 including:
    (a) incorporating between 1% and 70% by weight of said silica into said polyurethane.

13. The product of the method of claim 1.

14. In a method of manufacturing a urethane composition by the reaction of a hydroxyl terminated compound with an isocyanate, the improvement comprising:

(a) forming a modified urethane precursor by reacting a silica-organic linking component with silica particles;

(b) thereafter reacting a portion of said isocyanate with an organo reactive group of said linking component; and (c) reacting a remainder of said isocyanate with said hydroxyl terminated compound so as to form the modified urethane incorporating said silica therein.

15. In a method of manufacturing a polyurethane composition by reaction of polyisocyanates with polyols, the improvement comprising:

(a) first reacting particulate silica with a linking component having a silica reactive group and an organo reactive group;

(b) thereafter reacting a first portion of said polyisocyanate with said organo reactive group so as to join with said linking component and said silica; and (c) reacting a remainder portion of said polyisocyanate with said polyol so as to form a modified polyurethane wherein said silica is incorporated into the modified polyurethane polymer.

16. The method according to claim 15 wherein:

(a) said linking component is an aminoalkoxysilane.

17. The method according to claim 16 wherein:

(a) said linking component is an aminoalkyltrimethoxy silane.

18. The method according to claim 15 including:

(a) incorporating said silica in an amount from 1% to 70% by weight; and wherein:

(b) said silica has a diameter in the range about from 0.5 to 10 microns.

19. The method according to claim 15 including the step of:

(a) first fluidizing said silica with a portion of the polyol; and thereafter (b) reacting said linking component with said silica.

20. The method according to claim 15 including the step of:

(a) adding a polyurethane catalyst subsequent to allowing a substantial amount of said linking component to react with said silica and subsequent to addition of said polyisocyanate.

21. A method of manufacturing a modified polyurethane incorporating silica and having relatively good dynamic properties comprising:

(a) selecting a powdered silica in an amount from 1% to 70% by weight of final polyurethane and having a particle size in a range from about 0.5% to 10 microns;

(b) fluidizing said silica with a polyol;

(c) reacting hydroxyl groups on said silica with an amino group of an aminoalkoxysilane wherein each alkoxy is from 1 to 2 carbons long to form a first reaction mixture; and (d) thereafter adding and reacting polyisocyanate with said first reaction mixture to form said modified polyurethane.

22. The method according to claim 21 wherein:

a) said fluidizing polyol is a first polyol component chosen from polypropylene oxide, polyethylene oxide, polytetramethylene oxide and mixtures thereof having a hydroxyl equivalent weight between about 1000 and 2000;

(b) adding a second polyol component with said polyisocyanate; said polyisocyanate being chosen from MDI, TDI, PolyTDI, PPDI, HMDF and prepolymers and mixtures thereof; said polyisocyanate being added in amount to provide functional groups in a range from 1.1 to 1.25 as compared to functional groups of both said first and second polyol components;

(c) said silane is an amino alkyltrialkoxysilane; including the steps of:

(d) maintaining said first reaction mixture above 130° F. and under vacuum for a total time in the range from 1 to 4 hours; and e) adding a polyurethane catalyst to said reaction mixture after said silane and said polyol have been mixed and allowed to substantially react with silanol groups of said silica.

23. The method according to claim 22 wherein:

(a) said reaction mixture is maintained at about 220° F. throughout the method.

24. The method according to claim 22 wherein:

(a) said modified polyurethane is by weight about 50% silica, 0.075% silane and a remainder polyisocyanate and polyol.

25. The method according to claim 21 including:

(a) applying said modified polyurethane to an athletic surface.

26. The product of the method of claim 21.

27. A composition comprising a polymer having the following general formula: (-silica-silane-(diisocyanate-polyol)$_x$-diisocyanate-silane-)$_y$ wherein x and y are at least 1.

28. The composition according to claim 27 wherein:

(a) said silane is an aminoalkoxysilane.

29. The composition according to claim 27 wherein:

(a) the silane is aminoalkyltrialkoxysilane having an alkyl group between 1 and 20 carbons long and alkoxy groups between 1 and 6 carbons long; and said silica has a diameter in the range from about 0.5 to 10 microns.

30. A modified polyurethane floor coating having relatively good dynamic properties constructed of the composition of claim 27.

31. In a polyurethane polymer including isocyanate and polyol the improvement comprising:

(a) silica joined by a linking component into said polymer.

32. The composition according to claim 31 wherein:

(a) said linking component is an aminoalkoxysilane.

33. The composition according to claim 32 wherein:

(a) said silica has a diameter in the range from about 0.5 to 10 microns.

* * * * *